United States Patent
Cohen et al.

(10) Patent No.: US 10,520,723 B2
(45) Date of Patent: Dec. 31, 2019

(54) ULTRA-SONIC SELF-CLEANING SYSTEM

(71) Applicant: INTERNATIONAL BUSINESS MACHINES CORPORATION, Armonk, NY (US)

(72) Inventors: Guy M. Cohen, Ossining, NY (US); Lior Horesh, North Salem, NY (US); Raya Horesh, North Salem, NY (US); Theodore G. van Kessel, Millbrook, NY (US); Robert L. Wisnieff, Ridgefield, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/806,698

(22) Filed: Nov. 8, 2017

(65) Prior Publication Data

US 2018/0329206 A1    Nov. 15, 2018

Related U.S. Application Data

(63) Continuation of application No. 15/593,605, filed on May 12, 2017.

(51) Int. Cl.
| | |
|---|---|
| G02B 27/00 | (2006.01) |
| B08B 7/02 | (2006.01) |
| G01M 11/02 | (2006.01) |
| B08B 13/00 | (2006.01) |
| B60S 1/56 | (2006.01) |
| B06B 1/06 | (2006.01) |
| G01H 1/04 | (2006.01) |

(52) U.S. Cl.
CPC .......... *G02B 27/0006* (2013.01); *B08B 7/028* (2013.01); *B08B 13/00* (2013.01); *G01M 11/0278* (2013.01); *B06B 1/0644* (2013.01); *B60S 1/56* (2013.01); *G01H 1/04* (2013.01)

(58) Field of Classification Search
USPC ....................................... 359/508
See application file for complete search history.

(56) References Cited

U.S. PATENT DOCUMENTS

| | | | |
|---|---|---|---|
| 7,999,173 | B1 | 8/2011 | Ashpis |
| 8,390,175 | B2 | 3/2013 | Koshiishi et al. |
| 8,854,505 | B2 | 10/2014 | Okano |
| 9,123,845 | B2 | 9/2015 | Ashpis |
| 2015/0322220 | A1 | 11/2015 | Choi et al. |

(Continued)

FOREIGN PATENT DOCUMENTS

| | | |
|---|---|---|
| CN | 201579230 | 9/2010 |
| CN | 102445458 | 5/2012 |

(Continued)

OTHER PUBLICATIONS https://www.sonicsonline.com, retrieved Feb. 14, 2017.

(Continued)

*Primary Examiner* — Jennifer D. Carruth
(74) *Attorney, Agent, or Firm* — Tutunjian & Bitetto, P.C.; Vazken Alexanian

(57) ABSTRACT

Methods and systems for cleaning an optic include measuring a state of the optic. It is determined whether the optic needs to be cleaned based on the measured state of the optic. The optic is cleaned with ultrasonic vibrations if the optic needs to be cleaned.

18 Claims, 6 Drawing Sheets

(56) References Cited

U.S. PATENT DOCUMENTS

| | | | | |
|---|---|---|---|---|
| 2015/0368161 | A1* | 12/2015 | Murakami | B41J 2/14233 252/62.9 PZ |
| 2016/0146721 | A1* | 5/2016 | Ji | G01N 21/15 134/1 |
| 2016/0266379 | A1* | 9/2016 | Li | G02B 27/0006 |
| 2018/0329205 | A1* | 11/2018 | Cohen | G02B 27/0006 |

FOREIGN PATENT DOCUMENTS

| | | |
|---|---|---|
| CN | 104345524 | 2/2015 |
| CN | 204228198 | 3/2015 |
| CN | 105312777 | 2/2016 |
| CN | 105772380 | 7/2016 |
| JP | 58-139112 | 8/1983 |
| JP | 2006035139 | 2/2006 |
| JP | 4315448 | 8/2009 |
| JP | 5098364 | 12/2012 |
| JP | 5109412 | 12/2012 |
| WO | 2016/149046 | 9/2016 |

OTHER PUBLICATIONS https://www.gizmodo.com.au/2013/12/mclaren-is-using-fighter-jet-technology-for-wiper-free-windshields/, retrieved Feb. 14, 2017.
http://www.express.co.uk/life-style/science-technology/713821/Apple-Watch-Series-2-review-best-smartwatch-buy, retrieved Feb. 14, 2017.
https://www.youtube.com/watch?v=IRFysSAxWxl, retrieved Feb. 14, 2017.
http://www.imaging-resource.com/PRODS/E40D/E40DA4.HTM, retrieved Feb. 14, 2017.
List of IBM Patents or Patent Applications Treated as Related dated Nov. 8, 2017, 2 pages.
International Search Report for PCT/IB2018/052692 dated Jul. 11, 2018 (9 pages).

* cited by examiner

ULTRA-SONIC SELF-CLEANING SYSTEM

BACKGROUND

Technical Field

The present invention generally relates to lens, mirror and display cleaning systems and, more particularly, to the use of ultrasonic vibrations to clean such lenses and screens.

Description of the Related Art

Lenses, mirror, and displays often accumulate water, dust, and dirt. This occurs in every environment, ranging from televisions and desktop monitors to mirrors and cameras that are used in harsh external environments. The accumulation of moisture and debris can occlude visibility, necessitating cleaning. However, cleaning such surfaces can be inconvenient, difficult, or practically impossible, depending on the accessibility of the surface. Some examples include the backup cameras and external side mirrors of vehicles, surveillance cameras, and mobile device cameras. In each of these cases, dirt or moisture accumulation can prevent the device from being used as intended.

SUMMARY

A method for cleaning an optic includes measuring a state of the optic. It is determined whether the optic needs to be cleaned based on the measured state of the optic. The optic is cleaned with ultrasonic vibrations if the optic needs to be cleaned.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention employ ultrasonic vibrations to clean a lens, mirror or a display (referred to generally herein as "optics"). The optic may have an ultrasonic transducer attached or may, instead, be subjected to vibrations by a piezo-electric pellicle layer that is attached to the optic. The vibrations of the optic cause water, dust, dirt, and other contaminants to be thrown off the surface of the optic. This cleaning mechanism can be triggered manually or automatically. In particular, a variety of embodiments are provided herein addressed to different sensing and triggering mechanisms.

Figure 1:
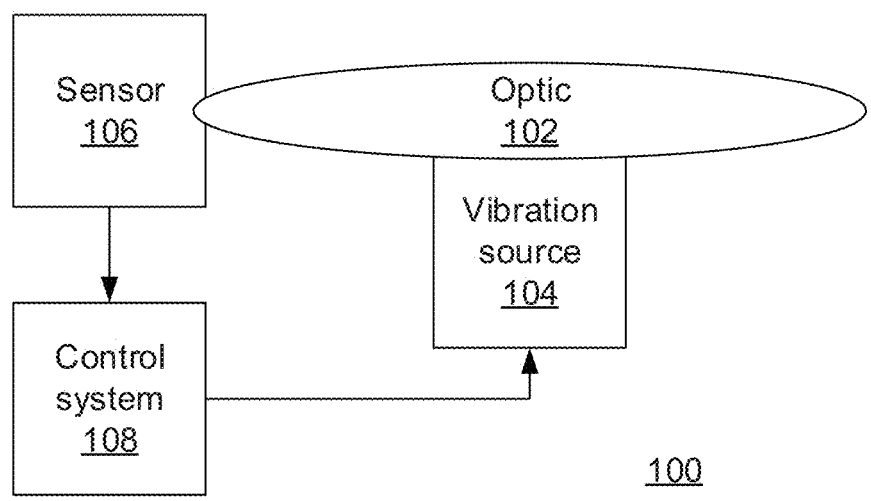
FIG. 1 is a block diagram of a ultrasonic self-cleaning optical system in accordance with an embodiment of the present invention.

Referring now to FIG. 1, self-cleaning optical system 100 is shown. An optic 102 may include, for example, a lens, a mirror, a display, or any other transmissive screen. The optic 102 may be formed from, e.g., glass, quartz, sapphire, acrylic, polycarbonate, or any other suitably rigid transmissive material. The term "transmissive" is used herein to denote a material that transmits electromagnetic radiation at one or more wavelengths of interest. The optic 102 needs to be capable of vibration at ultrasonic frequencies—materials that are insufficiently rigid may fail to efficiently transmit the ultrasonic vibrations to the debris.

A vibration source 104 applies an ultrasonic vibration to the optic 102. The vibration source 104 may be, for example, an ultrasonic transducer configured to vibrate against the optic 102 at ultrasonic frequencies by an electromagnetic or mechanical mechanism. In alternative embodiments, the vibration source 104 may include a pellicle and piezo-electric structure that vibrates when a voltage is applied. The term "ultrasonic" is used herein to denote sound wave frequencies in excess of about 20 kHz. It is specifically contemplated that frequencies above the audible range may be used, with frequencies in the hundreds of kHz also being possible.

A sensor 106 provides information that can help determine the state of the optic 102. In particular, the sensor 102 measures or estimates the occlusion of the optic 102 by, for example, a measurement of the optical, vibrational, or mechanical properties of the optic 102. Changes in these properties can indicate that the optic 102 is occluded or dirty. In particular, a shift in the resonant frequency of the optic can be used to measure the contamination load on the optic.

A control system 108 uses the information collected by the sensor 106 to make a determination of the state of the optic 102. In one example, the control system 108 may store factory values for the properties of the optic 102 and may make comparisons between the measured values and the stored factory values. Alternatively, the control system 108 may store in-use values and may detect changes to those values over time. When the state of the optic 102 degrades past a threshold, as described in more detail below, the control system 108 can automatically trigger a cleaning action. In another embodiment, implemented instead of or in addition to the automatic trigger, the control system 108 may accept input from a user or operator to trigger a cleaning action.

When a cleaning action is triggered, the control system 108 provides a signal to the vibration source 104, causing the vibration source to provide ultrasonic vibrations to the optic 102 and to clean the surface of the optic 102. The control system 108 can then use the sensor 106 to confirm that the state of the optic 102 has improved. If the state of the optic 102 has not improved, the control system 108 can trigger some further action (e.g., repeating the cleaning action or notifying a user or operator). If the state of the optic 102 has improved, the control system 108 can cause the vibration source 104 to turn off. The cleaning action can be performed for a fixed amount of time or may be performed at the same time as sensing, to be ceased when the sensing determined that the optic 102 is clean.

During the cleaning action, the vibration source 104 is configured to select a frequency that promotes traveling waves in the optic 102. Standing waves generate nodes and antinodes, where the nodes undergo very little translational movement. As such, areas of the optic 102 that are in a node of a standing wave may not be effectively cleaned. In some embodiments, the vibration source 104 may vary the frequency of vibration to ensure that the nodes' locations or patterns are changed. Furthermore, when the an excitation frequency change is not possible, the node pattern may be changed by changing a boundary conditions. For example, temporarily adding one or more restriction point along the edge of the optic elements forces zero movement at these points and thus changes the node locations.

In one embodiment, the control system 108 may include machine learning processes to learn the most effective vibration control sequence from previous cleaning actions. The control system 108 can be configured to optimize for, e.g., cleaning time or power consumption. The machine learning process collects instances of input, including initial data from the sensor 106, and output, including sensor data during and after the cleaning action, to learn in a supervised manner which outputs to use for particular inputs. In this manner the control system 108 can learn specific vibration controls (e.g., frequency, amplitude, and phase) to effectively clean the optic 102 based on sensor readings.

Figure 2:
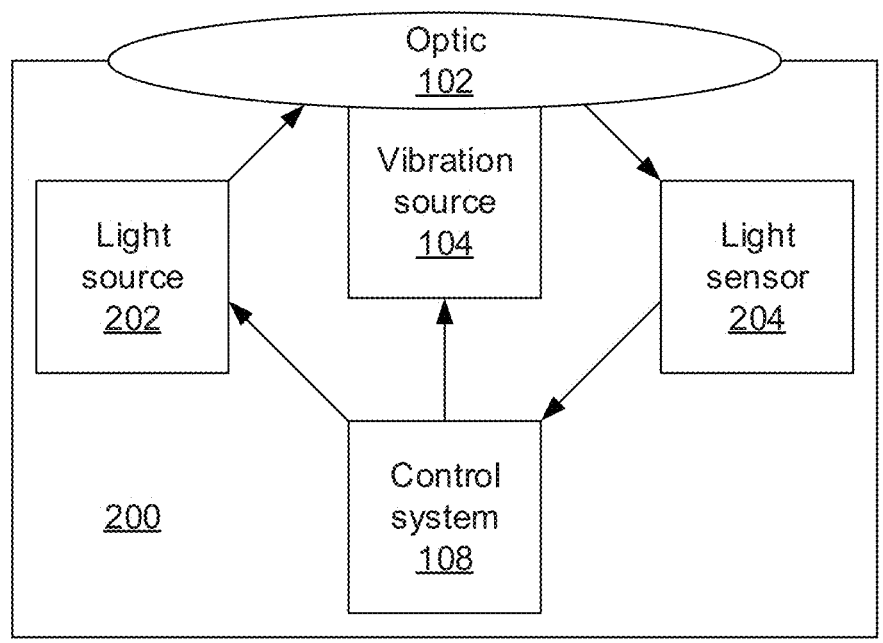
FIG. 2 is a block diagram of a ultrasonic self-cleaning optical system using light to sense an optic's state in accordance with an embodiment of the present invention.

Referring now to FIG. 2, an embodiment of a self-cleaning optical system 200 is shown where the vibration source 104 is implemented as an ultrasonic transducer and the sensor 106 can be implemented as a light sensor that is configured to measure, e.g., reflectance, transmission, and/or scatter of light on the optic 102. The sensor 106 can therefore include a light source 202 and a light sensor 204, for example a light emitting diode or laser and a photodiode. Light emitted by the light source 202 interacts with the optic and is measured by the light sensor 204.

It is specifically contemplated that the light source 202 and light sensor 204 will be disposed inside an enclosure, with the measurement being made without having to aim the light through the external surface of the optic 102. However, in an embodiment that measures transmission, one of the light source 202 and the light sensor 204 may be positioned outside the enclosure and aimed inward toward the complementary device to measure how much of the emitted light is transmitted through the optic 102.

The control system 108 may store a known-clean value for the value measured by the light sensor 204. This measurement may be performed at the factory, for example. If it is expected that the optical properties of the optic 102 may change over time (for example, polycarbonate optics may become cloudy after exposure to ultraviolet light), the known-clean value may be measured again to provide an updated value.

The light source 202 can provide a continuous output signal or may be triggered periodically or at will. The measured value is compared to the known-clean value. If the difference between the measured value and the known-clean value exceeds a threshold, or in alternative embodiments if the absolute value provided by the light sensor 204 falls below a threshold value, for example if the reflectance or transmission value is reduced by dirt or other contaminants, the control system 106 determines that a cleaning action is needed.

Figure 3:
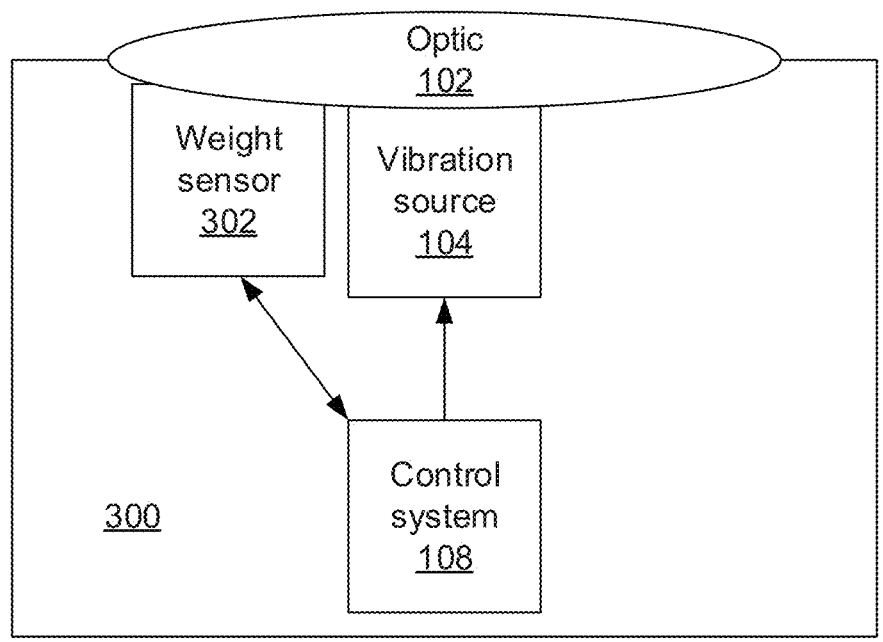
FIG. 3 is a block diagram of a ultrasonic self-cleaning optical system using weight to sense an optic's state in accordance with an embodiment of the present invention.

Referring now to FIG. 3, an embodiment of a self-cleaning optical system 300 is shown where the vibration source 104 is implemented as an ultrasonic transducer, the sensor 106 can be implemented as a weight sensor 302. In particular, the weight sensor 302 provides measurement values for the weight of the optic 102. A known-clean value for the weight of the optic 102 may be stored in the control system 108. As dirt or other contaminants accumulate on the lens 102, the weight value measured by the weight sensor 302 will increase. This increase in weight (mass) can be directly sensed by a shift in the acoustic resonant frequency of the optic and is directly sensible to the control system 106. In one embodiment, the driving frequency is varied while monitoring the amplitude of vibration from the vibration source 104 to determine the frequency at which the maximum amplitude of vibration is observed. This value can be directly compared to a historical value to estimate the change due to contamination. When the measured weight value is increased beyond a threshold value, or when the difference between the measured weight value and the known-clean exceeds a threshold value, the control system determines that a cleaning action is needed.

Figure 4:
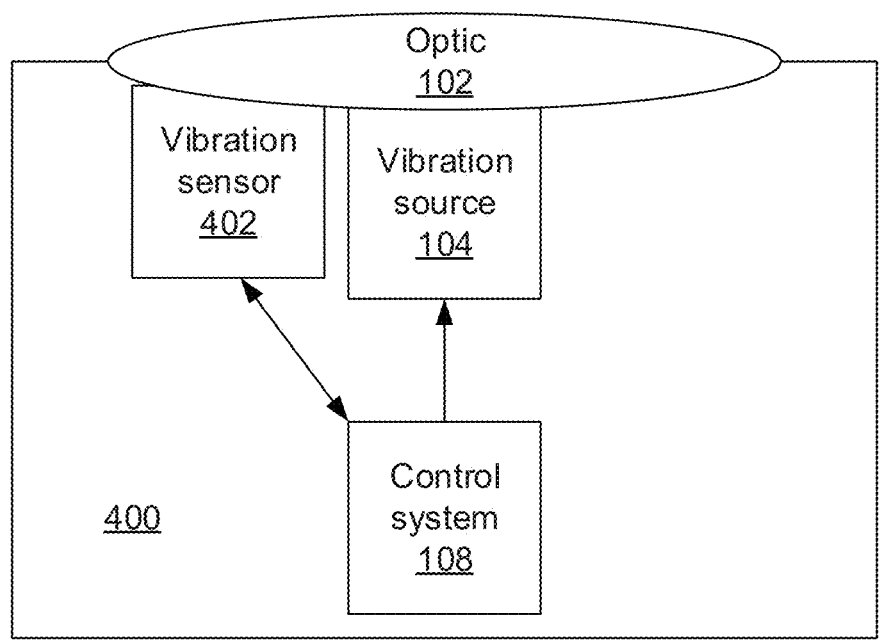
FIG. 4 is a block diagram of a ultrasonic self-cleaning optical system using weight to sense an optic's state in accordance with an embodiment of the present invention.

Referring now to FIG. 4, an embodiment of a self-cleaning optical system 400 is shown where the vibration source 104 is implemented as an ultrasonic transducer, the sensor 106 can be implemented as a vibration sensor 402. The self-resonance frequency of the optic 102 is determined by vibrating the optic 102 over a range of frequencies. The vibration source 104 provides ultrasonic signals across the range of frequencies and the vibration sensor 402 records a resulting vibration amplitude. At certain frequencies, where the self-resonance of the optic 102 is high, the vibration amplitude measured by the vibration sensor 402 will be higher than at non-resonant frequencies. The amplitudes are recorded at the control system 106 with their corresponding frequencies to build a resonance fingerprint of the optic 102.

As dirt or other contaminants accumulate on the surface of the optic 102, the vibrational properties of the optic 102 will change which, in turn, will change the self-resonance properties of the optic 102. The control system 106 triggers a measurement of the self-resonance of the optic 102 according to a schedule (e.g., periodically), continuously, or upon a request by a user or operator. The control system 106 provides a control signal to the vibration source 104 that causes the vibration source 104 to cycle the frequency range at an amplitude below that needed to clean the optic 102. The control system 106 determines how much the resonance fingerprint has deviated from a known-clean fingerprint. When the deviation exceeds a threshold, the control system 106 triggers a cleaning action. When a cleaning action is triggered, the control system 106 causes the vibration source 104 to apply ultrasonic vibrations at, e.g., a higher amplitude at a single frequency.

Figure 5:
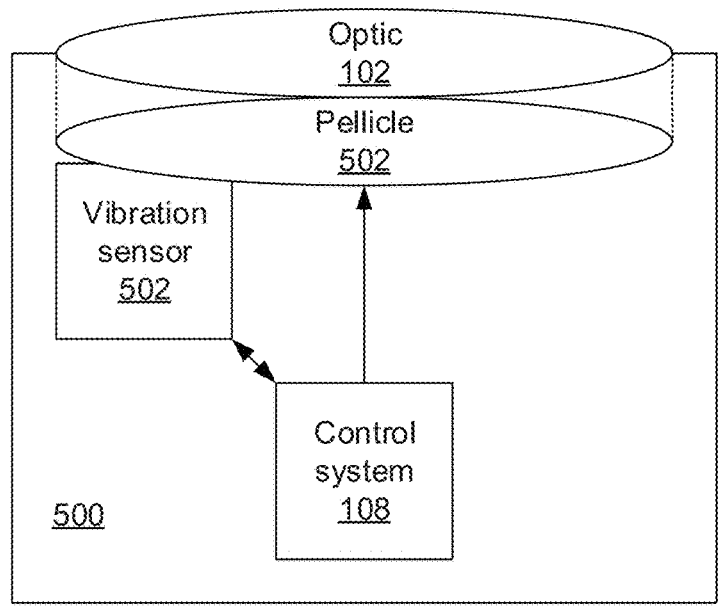
FIG. 5 is a block diagram of a ultrasonic self-cleaning optical system using a pellicle with a piezo-electric element in accordance with an embodiment of the present invention.

Referring now to FIG. 5, an embodiment of a self-cleaning optical system 500 is shown where the vibration source 104 is implemented as a piezo-electric pellicle 502. The pellicle 502 is attached to the surface of the optic 102, with a structure that is described in greater detail below. The pellicle 502 includes a piezo-electric component that vibrates when a voltage is applied by the control system 106. The state of the optic 102 can be measured by, e.g., the vibrational process described above, which determines the self-resonance of the optic 102. In such an embodiment, the pellicle 502 is vibrated across a range of frequencies and a known-clean resonance fingerprint is determined. Subsequent measurements may show that the resonance fingerprint has changed from the known-clean resonance fingerprint by an amount that exceeds a threshold. In this case, the optic may be determined to be dirty and the control system 106 triggers a cleaning action.

The use of the pellicle 502 has certain design advantages over the use of a transducer as a vibration source, including for example moving the surface to a desired location in the optical system (e.g., the conjugate plane), vibrational energy harvesting, improved vibrational and surface characteristics separate from those of the protected lens, separate manufacturing, etc. In one embodiment, the pellicle 502 includes a first optical surface. In an alternate embodiment the piezo electric element is embedded in the optic 102.

In one embodiment, an oscillating drive voltage may be applied to the pellicle 502 to excite ultrasonic emission that is transmitted to the optic 102. Alternatively, oscillations in the optic 102 can be transmitted to the pellicle 502 to excite a voltage that can be used for observation or energy harvesting. Thus while a separate vibration sensor 402 may be used, some embodiments omit the separate vibration sensor 402 and measure vibrational signals directly using the pellicle 502.

When harvesting energy, the voltage generated by the pellicle 502 can be used to charge a capacitor or a battery. The stored electrical energy can be used to control the cleaning system 500. The voltage created by the pellicle 502 can be measured and used to determine the state of the pellicle 502 or the motion of, e.g., a vehicle.

Figure 6:
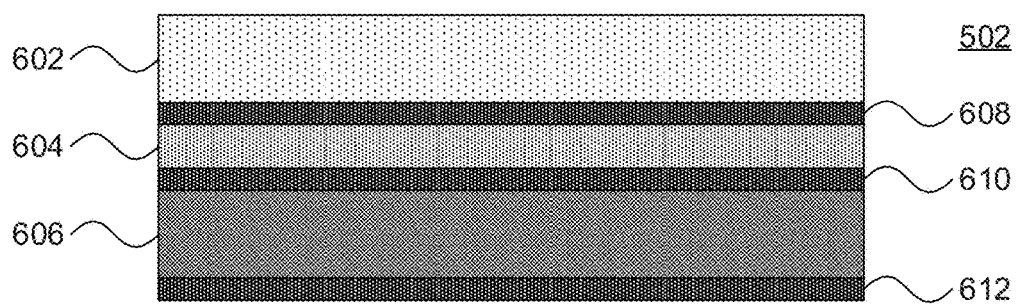
FIG. 6 is a cross-sectional view of the structure of a pellicle with a piezo-electric element in accordance with an embodiment of the present invention.

Referring now to FIG. 6, a cross-sectional view of the pellicle 502 is shown. The pellicle 502 includes a membrane 602. The membrane 602 is formed from a transparent material that may be treated to have a hydrophobic outer surface. It is specifically contemplated that quartz glass may be used for the membrane material, but alternative materials include, e.g., quartz, glass, sapphire, acrylic, and polycarbonate. The thickness of the membrane 602 will depend on the environment, diameter, and vibrational properties, but specifically contemplated embodiments will have a thickness of about 1 mm or less.

As noted above, the membrane 602 can have a hydrophobic treatment on an outer surface. There are many such treatments, but one treatment that is specifically contemplated for a glass or quartz membrane material is tridecafluoro-1,1,2,2-tetrahydrooctyl trichlorosilane.

The membrane 602 is mechanically attached to a metallized piezo-electric layer 604. It is specifically contemplated that the metallized piezo-electric layer 604 may be formed polyvinylidene fluoride at an exemplary thickness of about 80 μm, metallized with an appropriate metallic material such as nickel. Alternative piezo-electric materials that may be used include, e.g., quartz and lead zirconate titanate. A spacer 606 under the metallized piezo-electric layer 604 positions the membrane 602 and provides rigidity to the membrane 602 and the piezo-electric layer 604. In an alternative embodiment, the piezo-electric layer 604 may be applied in the form of an annular ring that is attached to or mechanically supports the optic 102.

Each layer of the pellicle 602 is attached to one another by adhesive layers. A first adhesive layer 608 attaches the membrane 602 to the piezo-electric layer 604. A second adhesive layer 610 attaches the piezo-electric layer 604 to the spacer 606. A third adhesive layer 612 attaches the spacer to the optic 102. The adhesive material may be selected from any appropriate adhesive, including for example acrylic, epoxy, cyanoacrylate, and peel-and-stick adhesives.

The metallized piezo-electric layer 604 includes electrodes that are connected to the control system 106. A voltage across the metallized piezo-electric layer 604 causes the layer to vibrate. The electrodes may be segmented and patterned to allow angular variation in a driving voltage. Additional contacts may then be provided between the metallized piezo-electric layer 604 and the control system 106. The electrode material can be transparent or of a dimension that does not interfere with the function of the optic 102. The electrode can be a film or discrete lines. In either case the electrode material can also make contact with an adhesive (if used).

Figure 7:
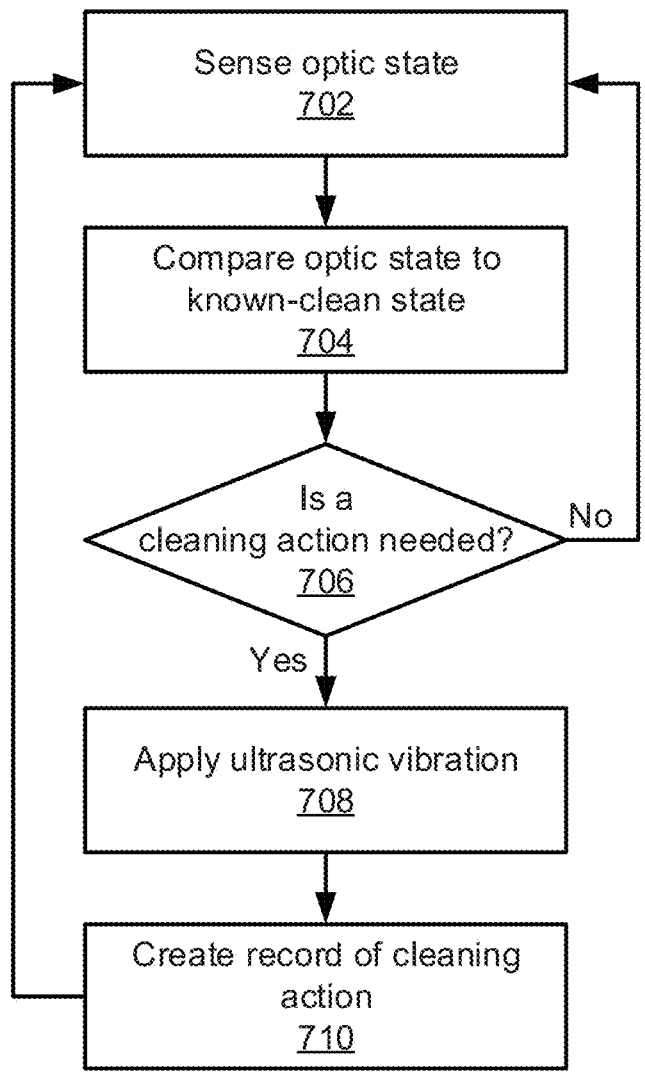
FIG. 7 is a block/flow diagram of a method of cleaning an optic in accordance with the present invention.

Referring now to FIG. 7, an automatic self-cleaning process for an optic 102 is shown. Block 702 uses sensor 106 to sense the state of the optic 102. As described above, this sensor may be any type of sensor that can appropriately determine a level of occlusion of the optic 102. Examples include, but are not limited to, light sensors 204, weight sensors 302, and vibration sensors 402.

Block 704 then uses the measured state of the optic 102 to compare the present state to a known-clean value, for example determined and stored at the factory. A difference between the values will determine a level of occlusion. Block 706 compares the difference to a threshold to determine if a cleaning action is needed. For example, if a light sensor 204 senses a light value that is a threshold amount below the known-clean light value, a cleaning action is needed. In an alternative embodiment, block 706 may determine that a cleaning action is needed based on whether the sensed value is has exceeded or fallen below some absolute value.

If a cleaning action is needed, block 708 applies an ultrasonic vibration to the optic 102. In some embodiments the ultrasonic vibration may be applied using a transducer as a vibration source 104. In alternative embodiments, the ultrasonic vibration may be applied using a piezo-electric pellicle 502. After the cleaning action is performed, or if no cleaning action is deemed to be needed, processing returns to block 702. Processing can be repeated continuously, periodically, at predetermined intervals, according to a preset schedule, or upon a manual trigger.

Upon performing a cleaning action, block 710 creates a record of the cleaning action. This record may include, for example, storing a timestamp in memory along with information regarding the sensor data. Such information can be used by service technicians to determine if repair or replacement is needed. For example, if cleaning is performed frequently, this may indicate that the state of the optic 102 has permanently degraded (e.g., by scratching or abrasion) and that the optic 102 should be replaced. The record may also include a notification to a user or operator of the system, notifying them that the cleaning action has been performed.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 8:
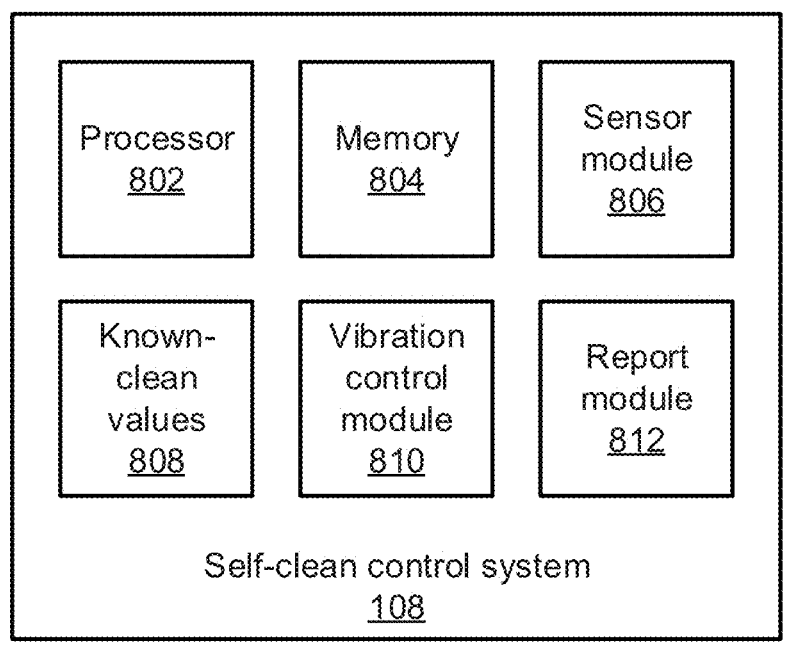
FIG. 8 is a block diagram of an ultrasonic self-cleaning control system in accordance with the present embodiments.

Referring now to FIG. 8, a block diagram of the self-clean control system 108 is shown. The control system 108 includes a hardware processor 802 and memory 804. The control system 108 further includes one or more functional modules that, in some embodiments, may be wholly or partially implemented as software that is stored in memory 804 and is executed by the processor 802. In other embodiments, the functional modules may be implemented as one or more dedicated hardware components, for example in the form of application-specific integrated chips or field programmable gate arrays.

A sensor module 806 interfaces with the sensor 106. This interface includes physical connections to the sensor 106. In some embodiments, the sensor module 806 may include the sensor 106 itself (e.g., a photodetector integrated with appropriate sensing circuitry), while in other embodiments the sensor 106 may be a separate component that communicates with the sensor module 806 by any appropriate wired or wireless communications link.

One or more known-clean values 808 are stored in the memory 804 and represent the state of the optic 102 as measured at a time and place when the optic 102 was known to be clean. The known-clean values 808 may be provided by the sensor module 806 in a special configuration mode in write-once fashion. In alternative embodiments, the known-clean values 808 may be updated or refreshed at later times to account for permanent alterations to the optic 102 (e.g., the progressive clouding of polycarbonate materials when exposed to ultraviolet).

A vibration control module 810 compares the current sensor values provided by sensor module 806 and compares them to the known-clean values 808. Based on this comparison, the vibration control module 810 determines whether to perform a cleaning action. If a cleaning action is needed, the vibration control module 810 triggers the emission of ultrasonic vibrations in the optic 102. In some embodiments, the vibration control module 810 may include the vibration source 104 itself. In other embodiments, the vibration source 104 may be a separate physical component that communicates with the vibration control module 810 by any appropriate wired or wireless communications link. A report module 812 writes a record of cleaning actions to the memory 804 and, optionally, provides a notification of the cleaning action to a user or operator.

Figure 9:
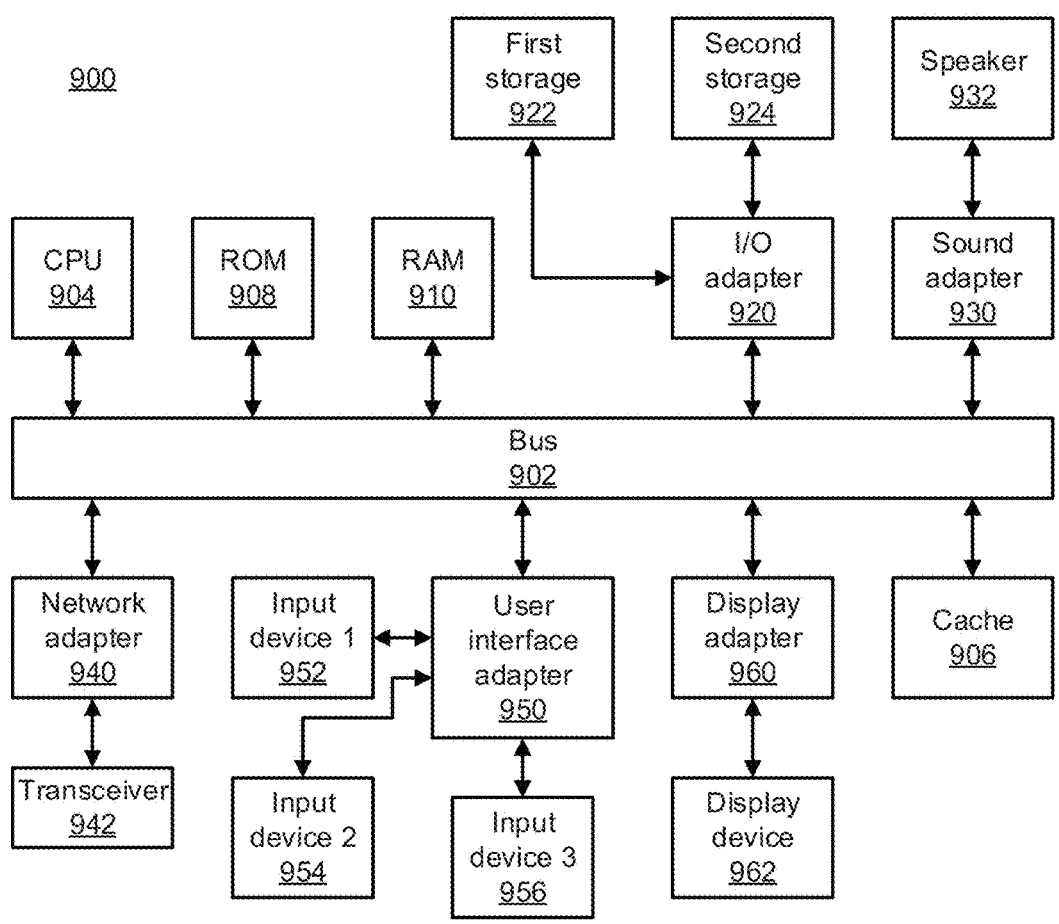
FIG. 9 is a block diagram of a processing system in accordance with the present embodiments.

Referring now to FIG. 9, an exemplary processing system 900 is shown which may represent the self-clean control system 108. The processing system 900 includes at least one processor (CPU) 904 operatively coupled to other components via a system bus 902. A cache 906, a Read Only Memory (ROM) 908, a Random Access Memory (RAM) 910, an input/output (I/O) adapter 920, a sound adapter 930, a network adapter 940, a user interface adapter 950, and a display adapter 960, are operatively coupled to the system bus 902.

A first storage device 922 and a second storage device 924 are operatively coupled to system bus 902 by the I/O adapter 920. The storage devices 922 and 924 can be any of a disk storage device (e.g., a magnetic or optical disk storage device), a solid state magnetic device, and so forth. The storage devices 922 and 924 can be the same type of storage device or different types of storage devices.

A speaker 932 is operatively coupled to system bus 902 by the sound adapter 930. A transceiver 942 is operatively coupled to system bus 902 by network adapter 940. A display device 962 is operatively coupled to system bus 902 by display adapter 960.

A first user input device 952, a second user input device 954, and a third user input device 956 are operatively coupled to system bus 902 by user interface adapter 950. The user input devices 952, 954, and 956 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 952, 954, and 956 can be the same type of user input device or different types of user input devices. The user input devices 952, 954, and 956 are used to input and output information to and from system 900.

Of course, the processing system 900 may also include other elements (not shown), as readily contemplated by one of skill in the art, as well as omit certain elements. For example, various other input devices and/or output devices can be included in processing system 900, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 900 are readily contemplated by one of ordinary skill in the art given the teachings of the present principles provided herein.

Having described preferred embodiments of an ultrasonic self-cleaning system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for cleaning an optic, comprising:
   measuring a state of the optic;
   determining that the optic needs to be cleaned based on the measured state of the optic;
   cleaning the optic with ultrasonic vibrations responsive to the determination that the optic needs to be cleaned; and
   changing a location of nodes in a standing wave of the ultrasonic vibrations by changing a frequency of vibration during cleaning.

2. The method of claim 1, wherein measuring the state of the optic comprises:
   generating light with a light source; and
   measuring an intensity of the generated light after the light interacts with the optic.

3. The method of claim 1, wherein measuring the state of the optic comprises weighing the optic.

4. The method of claim 1, wherein measuring the state of the optic comprises measuring a vibration amplitude of the optic at each frequency of vibration.

5. The method of claim 1, wherein determining whether the optic needs to be cleaned comprises comparing the measured state of the optic to a known-clean value.

6. The method of claim 5, wherein determining whether the optic needs to be cleaned comprises comparing a difference between the measured state of the optic and the known-clean value to a threshold.

7. The method of claim 1, wherein cleaning the optic comprises generating ultrasonic vibrations with a transducer in contact with the optic.

8. The method of claim 1, wherein cleaning the optic comprises generating ultrasonic vibrations with a piezoelectric element in contact with a pellicle on the optic.

9. The method of claim 1, wherein the optic is a lens.

10. A method for cleaning an optic, comprising:
measuring a state of the optic;
determining that the optic needs to be cleaned based on the measured state of the optic;
cleaning the optic with ultrasonic vibrations responsive to the determination that the optic needs to be cleaned; and
changing a location of nodes in a standing wave of the ultrasonic vibrations by changing a boundary condition of vibration during cleaning.

11. The method of claim 10, wherein measuring the state of the optic comprises:
generating light with a light source; and
measuring an intensity of the generated light after the light interacts with the optic.

12. The method of claim 10, wherein measuring the state of the optic comprises weighing the optic.

13. The method of claim 10, wherein measuring the state of the optic comprises:
vibrating the optic at a plurality of different frequencies; and
measuring a vibration amplitude of the optic at each of the plurality of different frequencies.

14. The method of claim 10, wherein determining whether the optic needs to be cleaned comprises comparing the measured state of the optic to a known-clean value.

15. The method of claim 14, wherein determining whether the optic needs to be cleaned comprises comparing a difference between the measured state of the optic and the known-clean value to a threshold.

16. The method of claim 10, wherein cleaning the optic comprises generating ultrasonic vibrations with a transducer in contact with the optic.

17. The method of claim 10, wherein cleaning the optic comprises generating ultrasonic vibrations with a piezoelectric element in contact with a pellicle on the optic.

18. The method of claim 10, wherein the optic is a lens.

* * * * *